US007248261B1

(12) United States Patent
Hakura (10) Patent No.: US 7,248,261 B1
(45) Date of Patent: Jul. 24, 2007

(54) METHOD AND APPARATUS TO ACCELERATE RENDERING OF SHADOW EFFECTS FOR COMPUTER-GENERATED IMAGES

(75) Inventor: Ziyad S. Hakura, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 393 days.

(21) Appl. No.: 10/736,953

(22) Filed: Dec. 15, 2003

(51) Int. Cl.
*G06T 15/60* (2006.01)
(52) U.S. Cl. ...................................... 345/426
(58) Field of Classification Search .................. None
See application file for complete search history.

(56) References Cited

U.S. PATENT DOCUMENTS

| 6,016,150 A * | 1/2000 | Lengyel et al. ............. 345/426 |
| 6,288,730 B1 * | 9/2001 | Duluk et al. ................ 345/552 |
| 6,903,741 B2 * | 6/2005 | Corbetta ...................... 345/426 |

OTHER PUBLICATIONS

Cass Everitt and Mark J. Kilgard, Practical and Robust Stenciled Shadow Volumes for Hardware-Accelerated Rendering, http://developer.nvidia.com/attach/5627, Mar. 12, 2002.

* cited by examiner

*Primary Examiner*—Kee M. Tung
*Assistant Examiner*—Aaron M. Richer
(74) *Attorney, Agent, or Firm*—Cooley Godward Kronish LLP (57) ABSTRACT

The present invention provides for accelerating the generation of graphical images that include shadow effects by, for example, reducing the amount of data transmitted and/or stored necessary to render graphics based on stencil shadow volumes. In one embodiment, an exemplary apparatus is configured to render shadows using stencil shadow volumes. The apparatus includes a memory to store a degree of shadowing for each sample. A co-processor, which is coupled to the memory, is configured to generate an indicator that represents a common degree of shadowing associated with the subset of samples. In some cases, the apparatus includes a graphics processing unit ("GPU"), which is coupled to the co-processor, that is configured to render one or more shadows for a computer-generated image based on the indicator.

12 Claims, 11 Drawing Sheets

METHOD AND APPARATUS TO ACCELERATE RENDERING OF SHADOW EFFECTS FOR COMPUTER-GENERATED IMAGES

FIELD OF THE INVENTION

The present invention generally relates to computer-generated imaging. More particularly, the present invention is directed towards accelerating the generation of shadowed objects in graphical images.

BACKGROUND OF THE INVENTION

The Graphics Processing Unit ("GPU") was developed to offload three-dimensional ("3D") calculations that had traditionally been performed by the central processing unit ("CPU"). A GPU is generally a processor responsible for performing, at relatively high graphics processing speeds, many or all of the functions of generating graphics, such as defining, positioning, texturizing, shading, and rendering primitives (e.g., polygons, such as triangles). The GPU has allowed developers of digital content to increase the detail and complexity of graphical images ("graphics") to provide more realism in computer-generated images by, for example, performing real-time rendering of shadow effects using stencil shadow volumes.

A shadow volume typically is a volumetric region of space that represents the shadow generated by a particular occluder for a particular light source. Any object within that volumetric region is considered "shadowed." Any boundary of a shadow volume defines a point (or plane) in space where an object goes from being unshadowed to shadowed, or vice versa. A stenciled shadow volume is a shadow volume wherein a shadow test uses a stencil buffer to determine if a given point is either inside or outside the shadow volume.

But using stencil shadow volumes have limitations in generating shadow effects. Shadow volume techniques generally require many shadow primitives that collectively consume relatively large amounts of pixel fill rate as well as computational overhead when rendering dynamic scenes. As such, the rendering of shadow effects using shadow volumes consumes more GPU processing capacity, more transmission channel capacity, and more storage than otherwise is desired.

Therefore, there is a need for a method and/or apparatus to accelerate the rendering of shadows for computer-generated scenes. In particular, there is a need to render shadow effects using reduced data to represent stencil shadow volumes to ensure that the resources of a GPU, such as memory (e.g., cache memory), are used in an efficient manner.

SUMMARY OF THE INVENTION

The present invention provides for acceleration in generating graphical images that include shadow effects. In one exemplary embodiment, a method provides for compression of information used for rendering shadows. In an illustrative method of the present invention, the method includes determining that each sample of a subset is associated with an equivalent degree of shadowing, and also includes generating an indicator representing the degree of shadowing associated with the subset of samples. In some embodiments, the degree of shadowing corresponds to a number of stencil shadow volumes associated with the subset.

In another exemplary embodiment, a representative apparatus is configured to accelerate the rendering of shadows using stencil shadow volumes. The apparatus includes a memory to store a degree of shadowing for each sample. A co-processor, which is coupled to the memory, is configured to generate an indicator that represents a common degree of shadowing associated with the subset of samples. In some cases, the apparatus includes a graphics processing unit ("GPU"), which is coupled to the co-processor, wherein the GPU is configured to render one or more shadows for a computer-generated image based on the indicator.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The present invention generally provides a method and an apparatus to determine a coarse representation to render shadow effects for a part of a scene, such as shadowed images generated by a GPU. As is typically the case when generating computer-generated images having shadows, a substantial amount of shadow effects remain unchanged over one or more frames. Thus, in accordance with the present invention, samples having similar shadowing characteristics can be identified and represented in a more general ("coarse") fashion rather than in a granular manner (e.g., a sample-by-sample basis). Once a determination is made that a number of samples for a part of the scene possess similar shadowing characteristics, then this number of samples can be identified and described as a group of samples. Therefore, data required to store and to transmit shadow-rendering information can be reduced. This reduction effectively is a form of data compression that reduces the amount of data transmitted and/or stored necessary to render graphics based on stencil shadow volumes. Accordingly, the present invention frees up pipeline fill, memory bandwidth (e.g., in memory, such as a cache memory), etc. such that the GPU and its related elements (e.g., other hardware resources, such as buses and memory) can realize increased processing capacity, which in turn, accelerates the rendering of shadowed, graphical images in accordance with at least one embodiment of the present invention.

In accordance with one embodiment of the present invention, a number of samples for a computer-generated image is tested to determine whether one or more objects associated with each of the number of samples is either fully illuminated or is shadowed, from a specific viewpoint. As described herein, the term "sample" can refer generally to an amount of information describing either a pixel for display on a view plane, such as on a display device, or a subpixel, where a subpixel refers to a subsampled pixel that is used generally for purposes of performing anti-aliasing, for example. In some embodiments, each sample of the number of samples generally has a spatial relationship with each other, as rendered on a view plane. For example, the number of samples can be rendered contiguously as a "tile" or as a quadrant of such a tile ("quad"). In other embodiments, these samples need not be rendered contiguously. A sample of the object is fully illuminated (i.e., unshadowed) if there is no obstruction between the light source and the object. But the sample is considered shadowed if one or more occluders form one or more shadow volumes in which the sample is enveloped. If each of the number of samples is determined to possess a similar shadow-related characteristic, then a reduced set of data describing this fact then can be made available to the GPU.

Figure 1A:
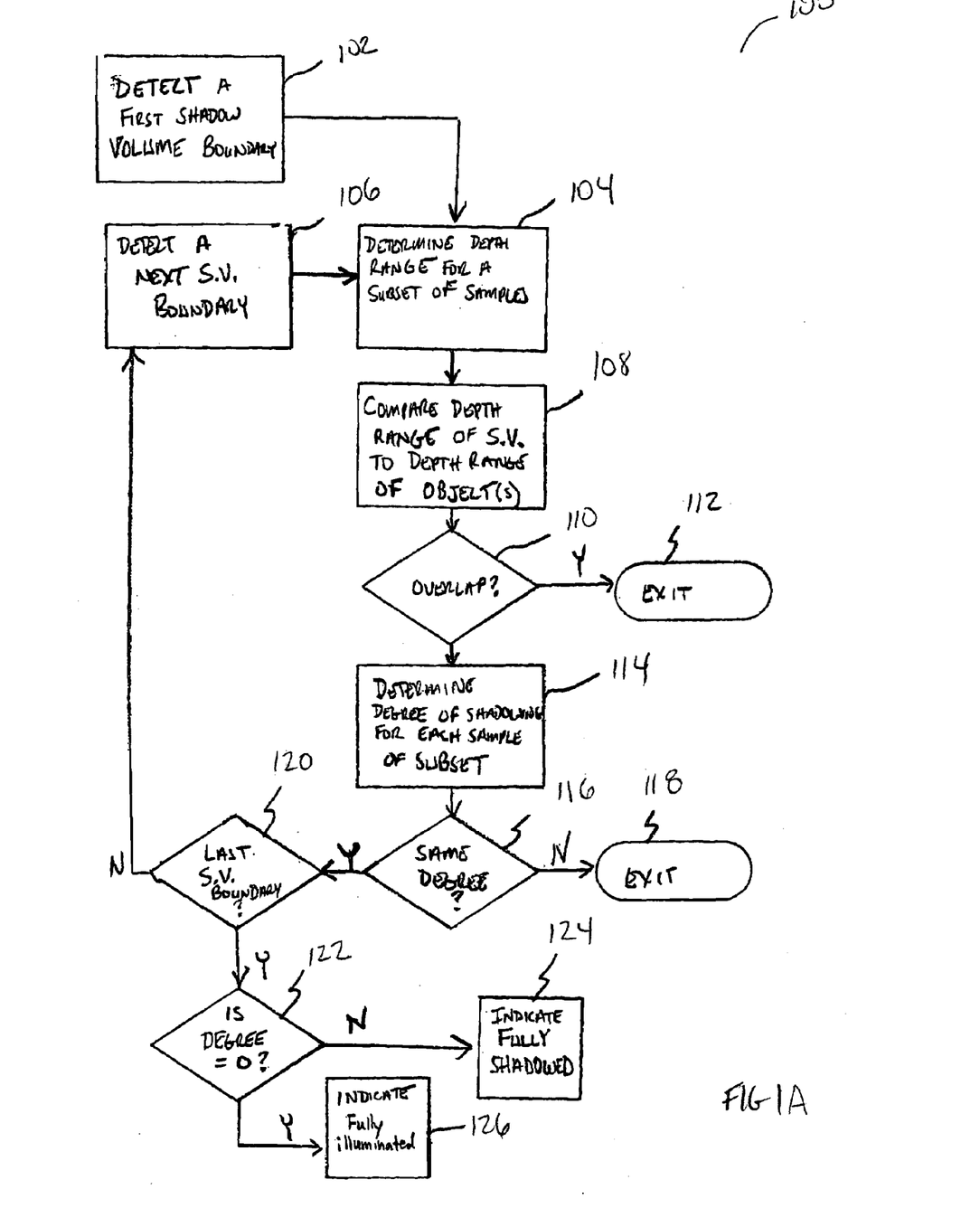
FIG. 1A is a flowchart depicting an exemplary method according to a specific embodiment of the present invention.

FIG. 1A is a flowchart depicting an exemplary method of generating minimal information to represent a number of samples, according to a specific embodiment of the present invention. FIG. 1A can be better understood in view of FIG. 2, which illustrates an exemplary scene including two shadow volumes. In this example, light source 202 generates shadow volume one ("SV1") 203 and shadow volume two ("SV2") 205, both forming five regions that can envelop an object. Region 1 "R1" is the space between view plane 210 and shadow boundary 250, which is the front face of SV1 203. Region 2 "R2" is the space between shadow boundary 250 and shadow boundary 252, which is the front face of SV2 205. Region 3 "R3" is the space generally located between shadow boundary 252 and shadow boundary 254, which is the back face of SV1 203. Region 4 "R4" is the space between shadow boundary 254 and shadow boundary 256, which is the back face of SV2 205. Lastly, region 5 "R5" is the space beyond shadow boundary 256. Regions 2 and 4 represent spaces that are shadowed by occluders 204 and 206, respectively, region 3 represents a space shadowed by both occluders 204 and 206, and regions 1 and 5 represent space where any object therein is full illuminated. As an example, "object C" 224 is wholly in region 5, and thus is fully illuminated (i.e., unshadowed).

Referring back to FIG. 1A, a first shadow volume boundary is "detected" at 102. The term "detected," as used herein, describes the determination of a specific depth (or depth range) from a point of reference (e.g., the view plane) for one or more primitives rendered during a shadow volume pass. Typically, all shadow volume primitive constituting each of the shadow volume boundaries are rendered prior to block 102. This first shadow volume boundary is analogous to detecting shadow boundary 250 by moving from a point of view 208 (e.g., a camera view) though view plane 210 at "Q1" to the front face of SV1 203. Q1 represents a subset of samples associated with "Quad One," which will be described below in connection with FIGS. 2 and 3. At 104 of FIG. 1A, a depth range for a subset of samples associated with a shadow volume boundary ("SVB") is determined along the Z-axis at a point where the first shadow volume boundary is detected. This SVB depth range is exemplified in FIG. 2 as range 212 between a point on the front face of SV1 203 near view plane 210 ("Qn(SVF1)") and a point on the front face of SV1 203 farthest from view plane 210 ("Qf(SVF1)").

Figure 2:
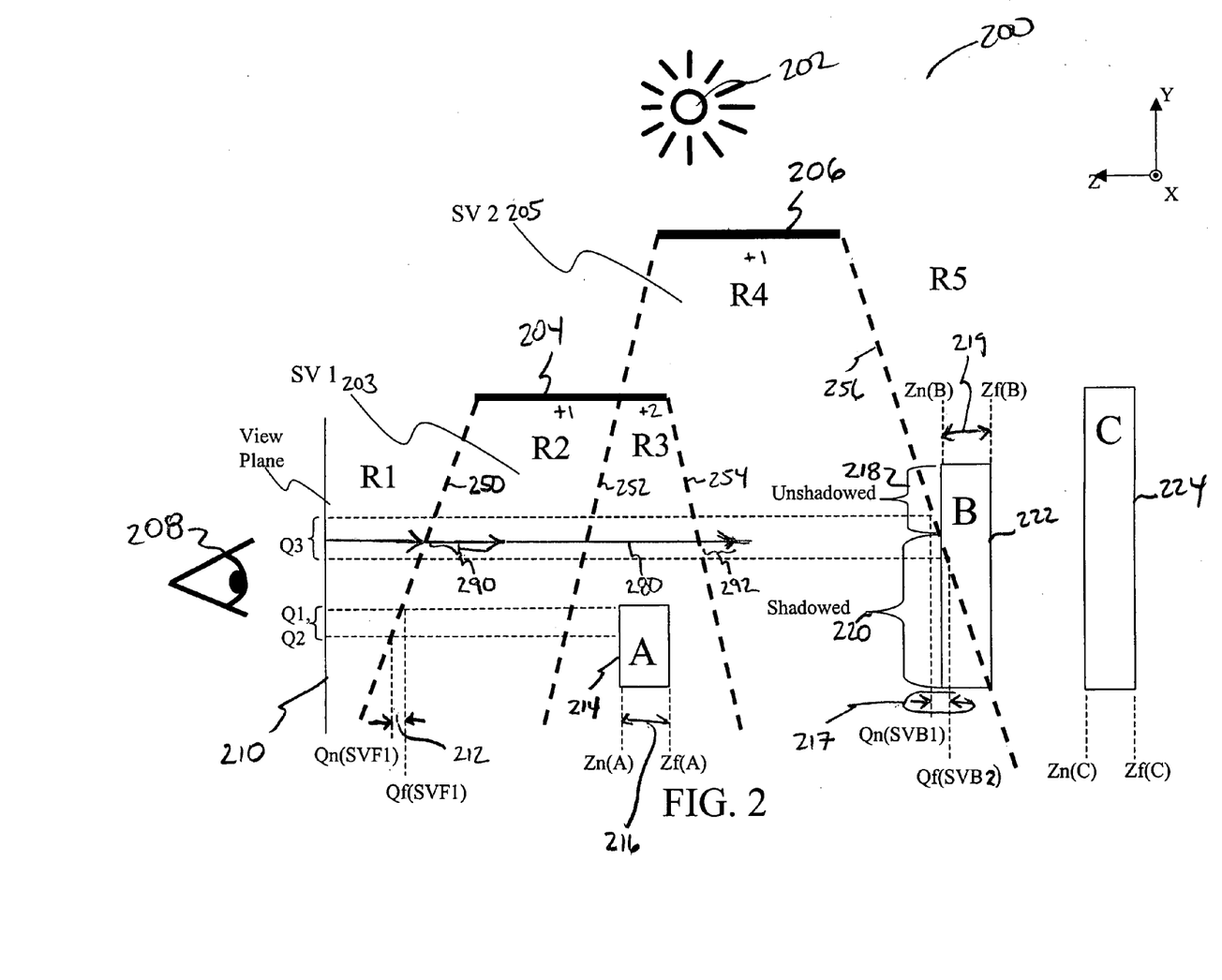
FIG. 2 illustrates an exemplary scene including two shadow volumes with which an exemplary method is performed, according to one embodiment of the present invention.

At 108 of FIG. 1A, the SVB depth range is compared against a depth range of the visible geometry ("VG") for one or more objects in the scene. This VG depth range is analogous with VG depth range 216 of FIG. 2, which is a depth range along the Z-axis (or an approximate depth range) defined from a point on a surface of an object, such as object A 214, nearest to view plane 210 ("Zn(A)") to a point of object A 214 farthest from view plane 210 ("Zf(A)"). At 110 of FIG. 1A, a decision resulting of the comparison at 108 is made as to whether the SVB depth range overlaps the VG depth range. A comparison of SVB depth range 212 against VG depth range 216, as shown in FIG. 2, results in a decision that there is no overlap at 110 of FIG. 1A. The exemplary method therefore would continue to 114. But if there were an overlap at 110, then flow 100 would be exited at 112. In accordance with one embodiment of the present invention, a subset of samples that are associated with an overlap, such as those at a silhouette edge, are processed on a sample-by-sample basis rather than processing those samples with a common value of shadowing. Thus, flow 100 exits 112 so that the samples can be processed on a sample-by-sample basis by, for example, a GPU.

An example of an exited flow at 112 is the case where "object B" 222 of FIG. 2 is bisected by SVB 256. Here, shadow boundary 254 is detected by moving from point of view 208 (e.g., a camera view) though view plane 210 at "Q3" to the back face of SV2 205. Q3 represents another subset of samples associated with "Quad Three," which will be described below in connection with FIGS. 2 and 3. In this example, SVB depth range 217, as defined from point Qn(SVB2) to point Qf(SVB2), is determined to overlap at least a portion of VG range 219. Thus, the flow 100 will be exited.

Returning to the discussion of flow 100 of FIG. 1A, a degree of shadowing for each sample of the subset is determined at 114. According to one embodiment of the present invention, the degree of shadowing for each sample is determined by using a "stencil enter/leave counting approach." Under this approach, a stencil is incremented as a specific sample "crosses" a rendered, front face of a shadow volume boundary into a shadow volume, and the stencil is decremented when the specific sample "crosses" a rendered, back face out from such a shadow volume. As described herein, when a sample is said to "cross" a shadow volume boundary, a portion of a ray, such as ray 280, either passes into or out from a shadow volume ("SV"). The ray can be described as a line projecting from a specific location at which the sample will be rendered on view plane 210 to a point associated with a sample of the visible geometry (such as a surface) for an object. For example, a ray portion 290 is the portion of ray 280 entering shadow volume one 203 (i.e., the sample has "crossed" a boundary into a SV) and a ray portion 292 is the portion of ray 280 leaving shadow volume one 203 (i.e., the sample has "crossed" a boundary out from a SV).

In some cases, the ray can be described as emanating from the point of the visible geometry to the view plane. The process of incrementing (e.g., adding one, or +1) and decrementing (e.g., subtracting one, or −1) can occur when a depth test passes (or in some cases, when the depth test fails). Generally, the results of the depth test depends on the magnitude of the depth of a visible geometry ("$D_{VG}$") from a view plane in relation to the magnitude of the depth of a shadow volume boundary ("$D_{SVB}$") from the same view plane. That is, if $D_{VG}$ is less than $D_{SVB}$, then an increment (or decrement) occurs. But if $D_{VG}$ is more than $D_{SVB}$, then a decrement (or increment) occurs. The specifics of depth testing by incrementing and decrementing need not be discussed in detail as its use is well known in rendering stencil shadow volumes. In other embodiments, "zpass," "zfail," and other like depth tests are suitable for determining the degree of shadowing in accordance with a least one embodiment of the present invention.

Regarding FIG. 2, a sample associated with Q1, as it (e.g., the sample or a line projecting therefrom) crosses SVB 250 (i.e., from R1 to R2), can be associated with an incremented stencil (e.g., buffered number) value of "+1." As that sample crosses SVB 252 (i.e., from R2 to R3), the stencil is again incremented to a value of "+2." Ignoring the presence of object A 214 for this immediate discussion, when the sample crosses both SVB 254 (i.e., from R3 to R4) and SVB 256 (i.e., from R4 to R5), the stencil is decremented each time (e.g., "−1") to arrive at a stencil value of "0," or zero, when the sample is in R5. An example of such a sample in R5 is any sample associated with the front face of "object C" 224 of FIG. 2. Thus, when a sample is tested and determined to have a nonzero stencil value, then the sample can be considered "shadowed." But if the sample is associated with a stencil value of zero, then the sample can be considered to be "fully illuminated." In view of the foregoing, each region can be associated with a "degree of shadowing" that can be equivalent to the stencil count as generated in accordance with the enter/leave counting technique described above. Although only two shadow volumes are shown in FIG. 2, exemplary apparatus and methods of the present invention can apply to any number of shadow volumes, and in some cases, to other shadow rendering techniques.

At 116 of FIG. 1A, a determination is made as to whether one or more samples of the subset of samples have an equivalent degree. In some embodiments, such a determination is made for all samples of the subset. If not all samples have an equivalent degree of shadowing, flow 100 is exited at 118 because a determination cannot be made as to whether all are samples are either fully illuminated or fully shadowed. But if each sample has an equivalent degree at 116, then flow 100 continues to decision block 120. At 120, a decision is made as to whether the last SVB along a line parallel to the Z-axis has been crossed. If not, then flow 100 continues to block 106. At 106, a next SVB is detected, such as SVB 252 of FIG. 2. But if no more SVBs are to be crossed by a particular sample, then flow 100 continues to 122.

At 122, a decision is made as to whether one or more samples of the subset of samples are associated with a degree of shadowing equal to zero (i.e., where there is no shadowing for all of these samples). In some embodiments, such a determination is made for all samples of the subset. If this is the case, then an indication is generated to classify those samples as being illuminated (i.e., fully illuminated) at 126. But if the one or more samples of the subset of samples are a degree of shadowing other than zero, that at least another indication is generated to classify those samples as being shadowed (i.e., fully shadowed) at 124. In at least one embodiment, the degree of shadowing is also incorporated into the indication (e.g., whether the degree of shadowing is a result of being in two shadow volumes, such as R3). Although the value of "zero" in this example is used as a reference value to indicate that the associated samples have no shadowing (i.e., fully illumination), a person having ordinary skill in the art should appreciate that any reference value can be used to indicate no shadowing. For example, a value of "128" can represent illuminated samples, and values from 0 to 127 and values from 129 to 255 can represent shadowed samples if an 8-bit stencil is used. Other stencil values for representing illumination and shadow, as well as other stencil sizes (e.g., other than 8-bit), are within the scope and spirit of the present invention.

Figure 1B:
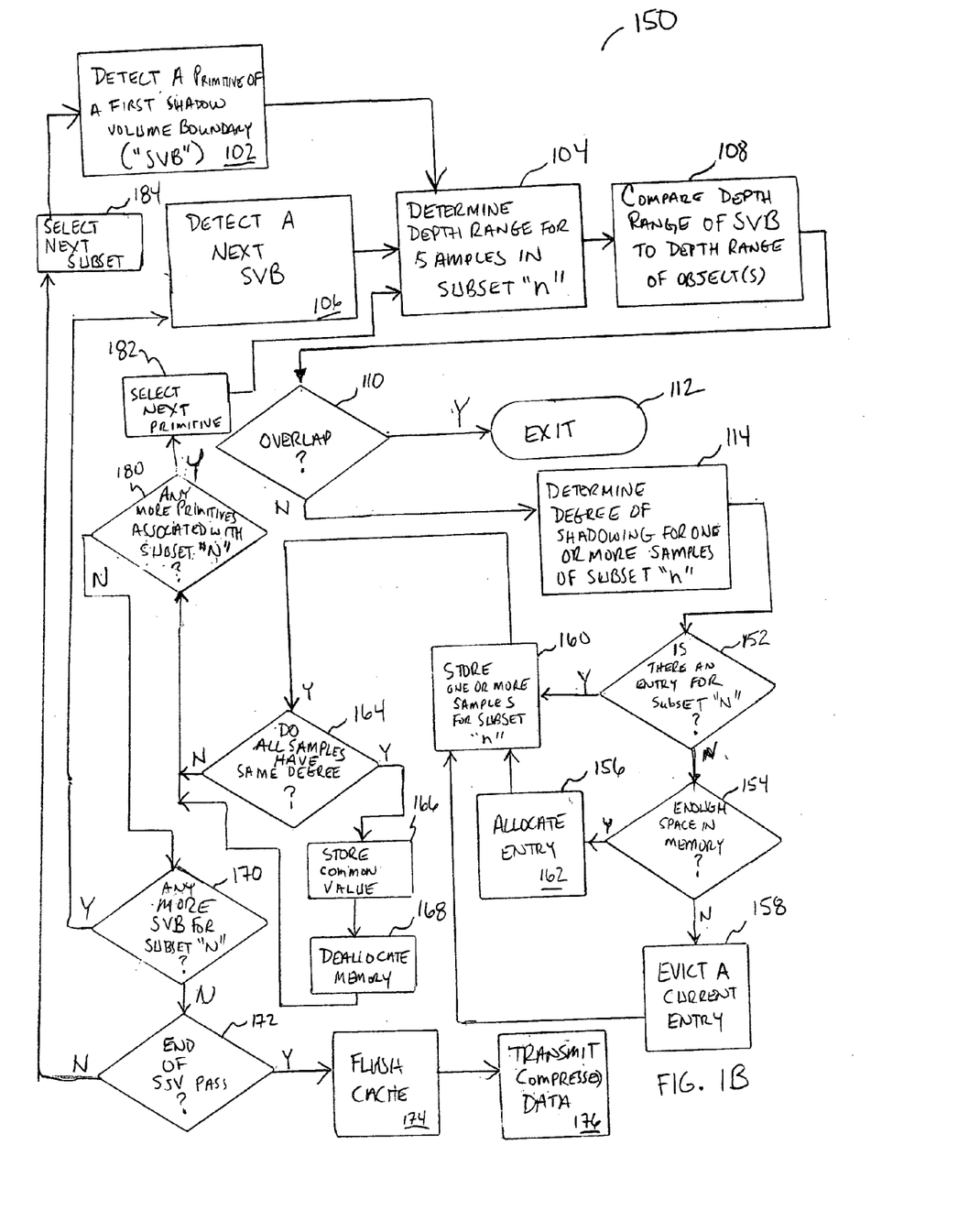
FIG. 1B is flowchart depicting another exemplary method according to another specific embodiment of the present invention.
Figure 7A:
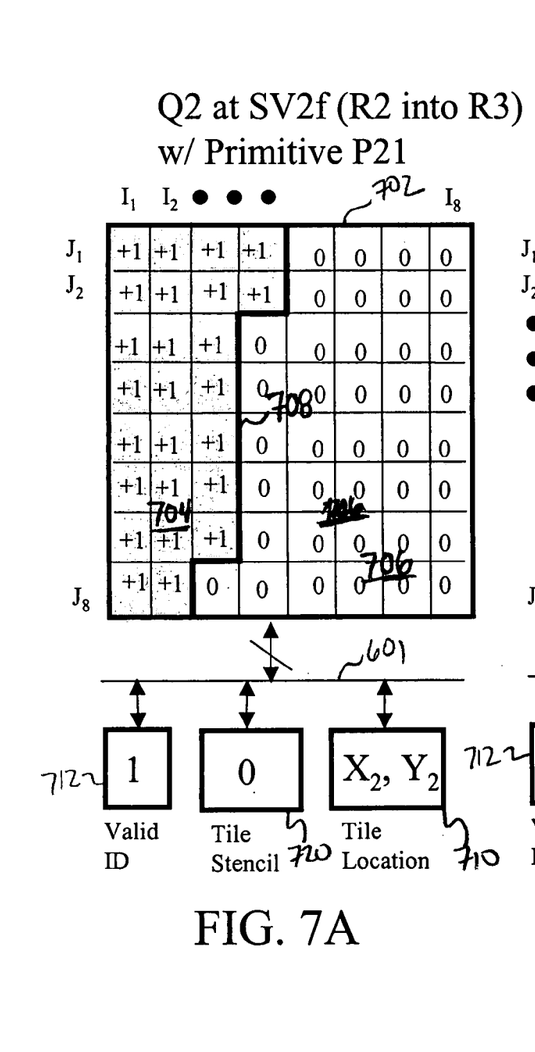
FIGS. 7A–7C show a series of depictions representing a part of the memory for determining whether to compress information relating to a second subset of samples in accordance with one embodiment of the present invention.
Figure 7B:
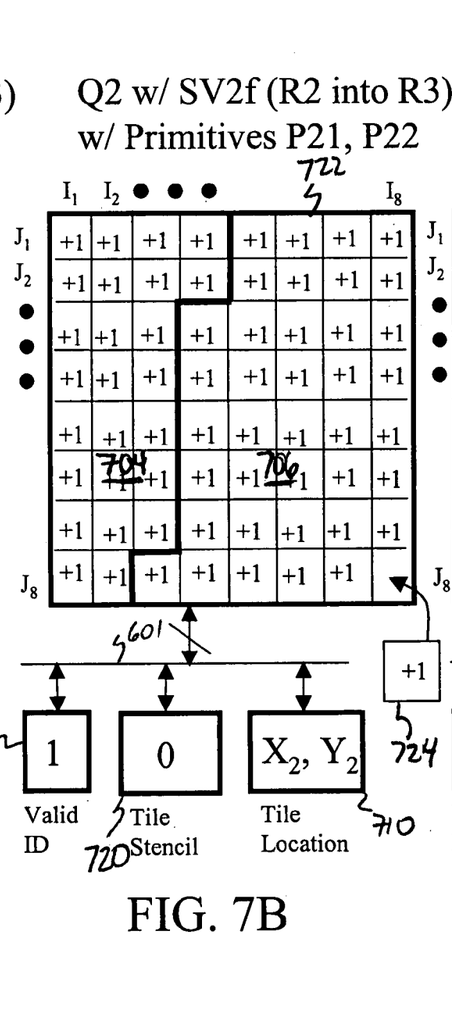
Figure 7C:
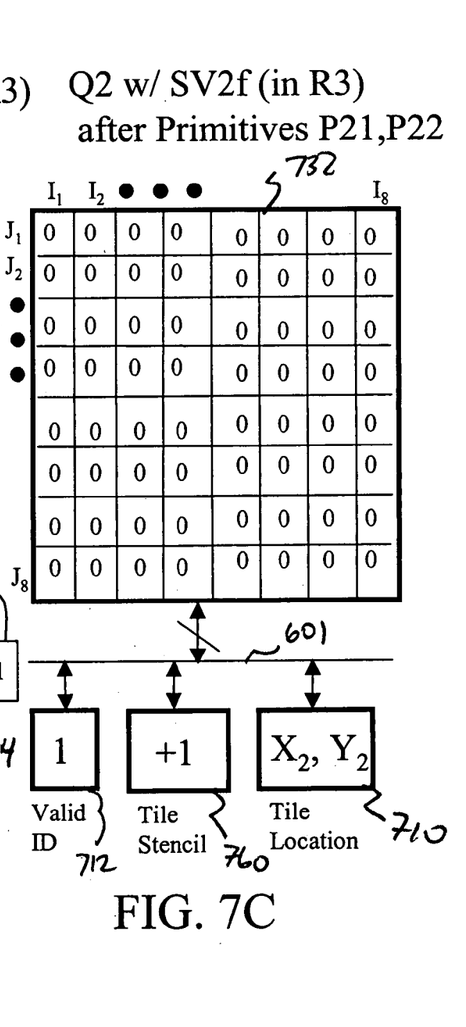

FIG. 1B is flowchart depicting another exemplary method according to another specific embodiment of the present invention. Flow 150 of FIG. 1B depicts one way to implement data reduction, according to the present invention, whereby available memory, such as a cache, is managed during a stencil shadow volume rendering process. For example, memory can be deallocated in accordance with flow 150 if the contents of the memory can be compressed (e.g., represented by a common value, such as a tile stencil value). At 102, a primitive of a first SVB is selected for evaluation with respect to a subset of samples, such as a quad. Block 104 is similar to that of FIG. 1A, but expressly includes selecting a particular subset "N" of samples from a group of subsets. Blocks 108–112 are similar in functionality as those of FIG. 1A. At 114, a degree of shadowing for one or more samples of subset "N" is determined. In particular, those samples associated with the primitive are evaluated as to their degree of shadowing. The remainder of the samples (i.e., samples other than the one or more samples) that are not associated with the primitive can be evaluated with respect to a next primitive (or multiple next primitives). An instance where not all samples are evaluated at 114 for a specific point in time is illustrated in FIGS. 7A–7C (namely FIG. 7B).

At 152, data representing the degree of shadowing for each of the one or more samples is stored in memory for subset "N." Here, a determination is made as to whether an entry exists for storing information that is associated with subset "N." If an entry exits, then the degree of shadowing for each of the one or more samples is stored in a memory at 160. In accordance with one embodiment, the memory is a cache memory and each of the samples is stored in a delta count buffer. Each delta count buffer is designed to store data representing an offset from a common value (i.e., a tile stencil value). As such, a delta count buffer can be smaller in size than is normally used to represent a degree of shadowing. Normally, larger sized buffers are used to store degrees of shadowing. Consequently, a smaller amount of total memory (over storage of all samples) can be implemented to accomplish what normally required more memory, according to the present invention. For example, a delta count buffer might have a size of 3 bits in contrast to a normal implementation of buffers having sizes of 8 bits or more.

But if there is no entry for the one or more samples at 152, then flow 150 continues to 154. At 154, a determination is made as to whether the memory has free space to allocate for storing the one or more samples. If there is free space, then memory is allocated at 156 and the one or more samples are stored in individual delta count buffers at 160. Allocation of memory can be in accordance with any well-known techniques for allocating cache memory, if the memory is a cache. But if there is no space available, then a current entry in memory is evicted at 158. Although an ordinarily skilled artisan will realize that there are various ways of selecting how to evict a current entry, the age of a non-updated current entry can be considered in making such a determination. After the current entry is evicted, data representing the degrees of shadowing of the one or more samples are then stored at 160. After 160, flow 150 continues to 164.

At 164, a determination is made as to whether each of the stored samples of subset "N" have an equivalent degree of shadowing. For example, if a value of 128 represents samples that are illuminated, this value can be considered a reference from which to describe degrees of shadowing for the samples. In accordance with one embodiment, a degree of shadowing for each of the one or more samples can be represented as an offset from the reference. And if each of the samples has the same degree of shadowing, then data representing each of those degrees can be "coalesced" into data representing a common value, which is a compressed representation of shadowing for each of the samples.

For example, consider that each of the samples is associated with a value of 129, as determined at 114, which is one degree offset from the reference value. The offset value, which is associated with a degree of shadowing, can be stored in each of the delta count buffers at 160 as "+1." This value is equal to the reference "128" subtracted from "129." Because the value of +1 is stored in each delta count buffer, then this value can be stored as a common value. Consequently, the value of +1 can be a common value with which to represent the degree of shadowing for the subset. As such, the cache entry is considered "coalesced" from the many same values for the samples into a single common value. Thereafter, the delta count buffers configured to store data for subset "N" can be deallocated at 168 to store other data, such as offset values for other subsets of samples. After a portion of the memory is deallocated at 168, then flow 150 moves to 180, which is also the point of continuation for flow 150 from 164, if not all samples have the same degree of shadowing. That is, the delta count buffers can include different offset values, such as –1, 0, +1, etc. As such, those delta count buffers with different offset values generally cannot be "coalesced" (at least at one point of time) into a common value.

At 180, a determination is made as whether any more primitives are associated with subset "N," such as the remainder of samples. If there are more primitives, then flow 150 continues to 182 to select a next primitive of the SVB that may or may not be used to evaluate the remaining samples of subset "N." After the next primitive is selected, flow 150 continues at 104 to perform similar processes described previously. The determination at 180 as to whether there is another "next" primitive can be repeated for all primitives for a particular SVB. But if there are no more primitives to be evaluated for subset "N" for the particular SVB, then flow 150 flow to detect another SVB at 170.

At 170, a determination is made as to whether additional SVBs are to be evaluated. If so, then flow 150 continues to 106 to detect a next SVB to evaluate other primitives against the samples of subset "N." But if there are no more SVBs, then a determination is made at 172 as to whether the stencil shadow volume (SSV) rendering pass is completed. If not, flow 150 continues to 184 to select another subset (e.g., another quad) to repeat the previously described subprocesses. Thereafter, the degrees of shadowing for samples in another subset "N+1" are evaluated similarly as was subset "N." Note that if the end of the SSV pass has been reached, then flow 150 continues to 174.

At 174, the entries of each of the subsets are examined to determine whether any of the non-coalesced samples for any of the subsets, as determined by prior steps of flow 150, still have varied values of offsets (e.g., such as samples associated with different offset values, of –1, 0, +1, and +2). Once so determined, the common values stored for these subsets are deemed invalid. As is described in connection with FIG. 8C, a subset can be invalidated by, for example, resetting a bit representing its validity (i.e., resetting valid bit to zero). In a specific embodiment, a GPU will ignore the common values associated with non-coalesced subsets and will require shadow information for each of the samples for a given subset for rendering related shadows. At 176, the common values, as compressed data, are transmitted to a GPU and stored in a frame buffer for use in rendering shadows with respect to graphical images. So when an image is to be prepared for display, rendered shadows (and shadowing) can be produced using a common value for the associated samples in accordance with the present invention.

Figure 3:
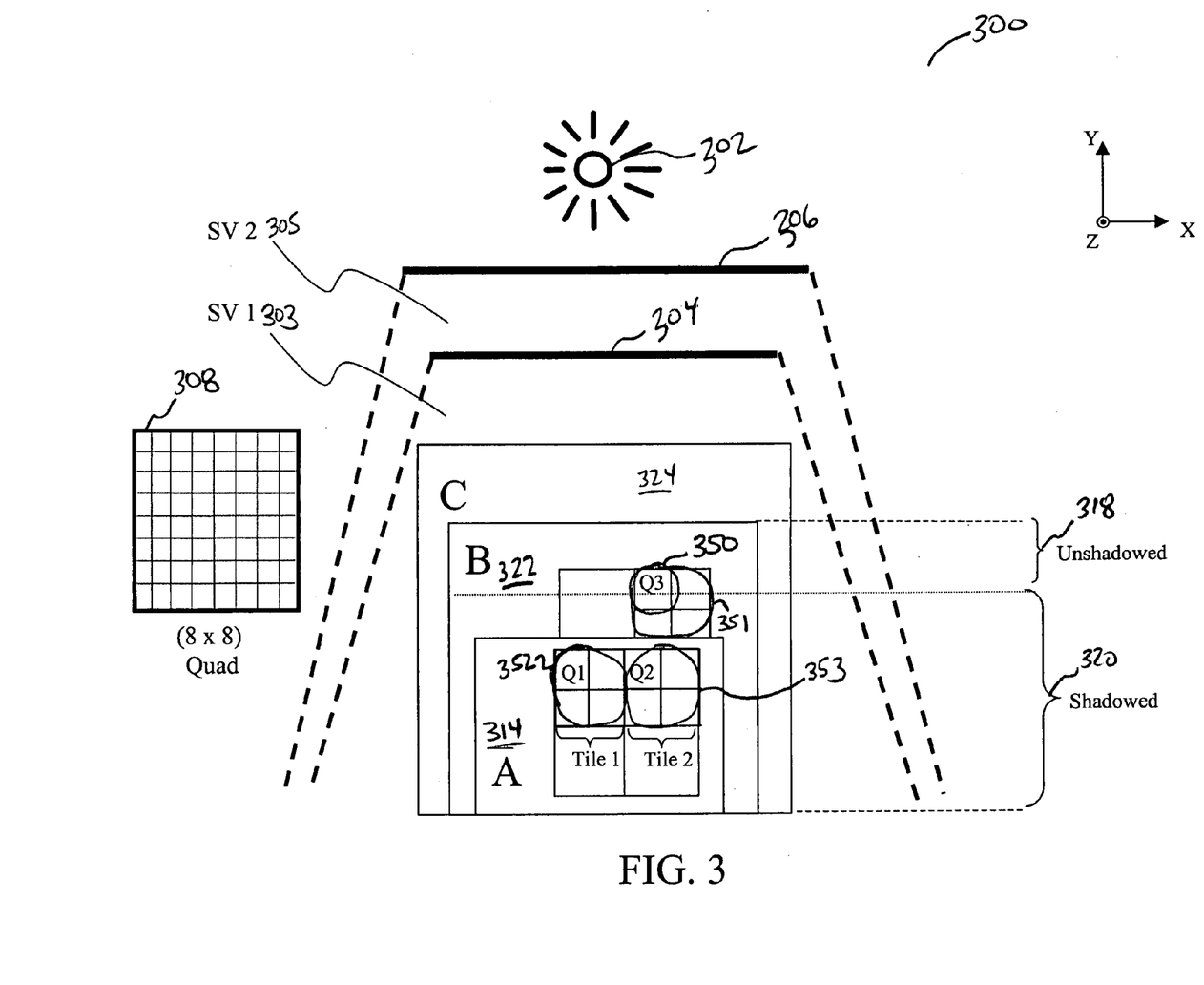
FIG. 3 illustrates another view of an exemplary scene of FIG. 2, according to a specific embodiment of the present invention.

FIG. 3 illustrates another view of the exemplary scene of FIG. 2, according to a specific embodiment of the present invention. In this view, the scene is shown from the perspective from view plane 210 of FIG. 2 (i.e., Z-axis is out from page). As shown in FIG. 3, light source 302 is directed over occluders 304 and 306 to generate shadow volumes one ("SV1") 303 and two ("SV2") 305, respectively. Although only one light source 302 is shown in FIG. 3, flow 100 of FIG. 1A can be repeated for each of multiple light sources, if applicable. Also shown are objects A 314, B 322 and C 324, each of which is analogous in size and spatial disposition to the similarly named objects shown in FIG. 2.

In accordance with a specific embodiment of the present invention, a view plane (not shown in its entirety) is composed of a number of subdivided groups of samples, such as tiles 352 and 353. In this example, tile one ("tile 1") 352 and tile two ("tile 2") 353 each includes four quadrants of samples. "Tile 1" 352 includes Quad One, or Q1, and "Tile 2" 353 includes Quad Two, or Q2. Q1 and Q2 are analogous with Q1 and Q2, respectively, of FIG. 2. Tile three 351 includes Quad Three ("Q3") 350. As shown in FIG. 3, "Q3" 350 is bisected by a shadow volume boundary (i.e., SVB 256 of FIG. 2) to form a partially unshadowed area 318 (218 of FIG. 2) and partially shadowed area 320 (220 of FIG. 2). According to a specific embodiment, quads Q1, Q2 and Q3 are each associated with a number of samples shown in quad 308. In this example, each quad can be considered as an 8-by-8 subset of samples (i.e., 64 samples) that are subjected to a depth test to determine the degree of shadowing. Although, a quad in this example includes 64 samples, any number of samples can be included in a quad. Further, samples of a quad need not be contiguous in a view plane. Moreover, the exemplary method described in FIG. 1A can apply to fewer samples than compose a quad. For example, a supersampled quad, such as Q1, might only have half the number of samples contained therein be used according to the present invention.

Figure 4A:
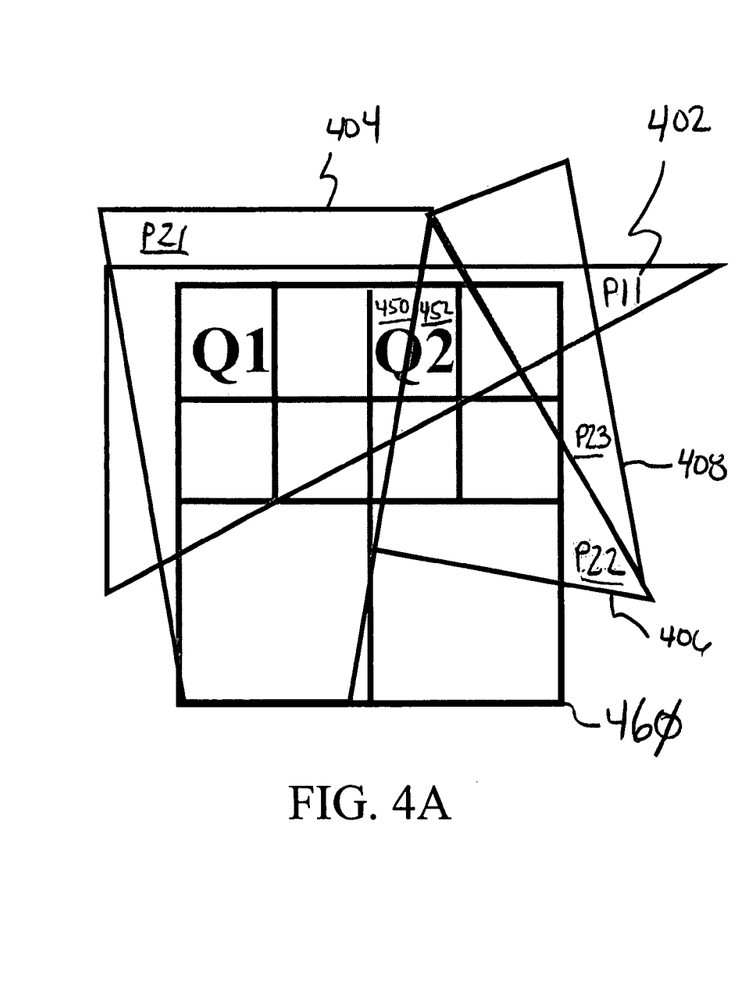
FIGS. 4A and 4B illustrate shadow volume primitives formed between a view plane and an exemplary object, according to one embodiment of the present invention.
Figure 4B:
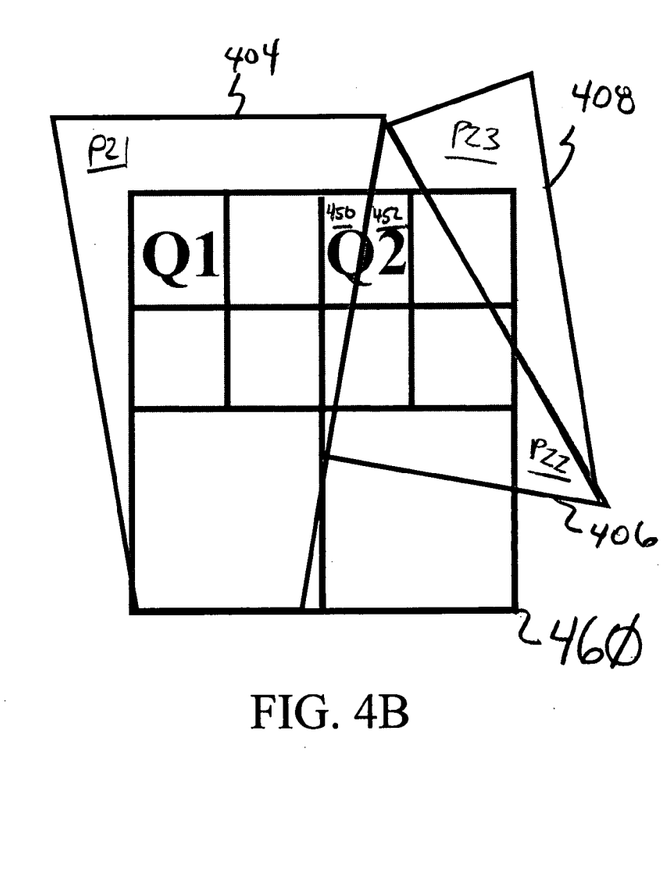

FIGS. 4A and 4B illustrate shadow volume primitives formed between a view plane and an exemplary object, such as object A 314 of FIG. 3, according to one embodiment of the present invention. In some aspects of the present invention, one or more shadow volumes associated with a light source are rendered for determining whether a SVB depth range overlaps a VG depth range, as exemplified at 110 of FIG. 1A. These shadow volumes are generally composed of many primitives, such as triangles or any other kind of primitive, each of which is associated with a SVB depth range that requires a comparison with a VG depth range associated with an object. As shown in FIG. 4A, a group 460 of four tiles is depicted as being "covered" by primitives. Group 460 includes two tiles that are each subdivided into quadrants. Among these quadrants are "Q1" and "Q2," which are analogous to Q1 and Q2 of FIGS. 2 and 3.

Further to this example, primitive "P11" 402 is a polygon rendered as part of the front face of a first shadow volume plane, which is similar to SVB 250 of FIG. 2. Primitive "P11" 402 is shown to "cover" both Q1 and Q2. That is, primitive "P11" 402, as viewed from the view plane, is disposed between each sample associated with quads Q1 and Q2 and the visible geometry of object A 314 of the scene shown in FIG. 3. Primitive "P21" 404, primitive "P22" 406, and primitive "P23" 408 are shown to collectively cover both Q1 and Q2 and are rendered as part of the front face of a second shadow volume plane, such as SVB 252 of FIG. 2. Primitives 404, 406 and 408 are each disposed between SVB 250 of FIG. 2 and object A 214. As shown, primitive 404 completely covers Q1. Further, primitive 404 covers a first part 450 of Q2 and primitive 406 covers a second part 452 of Q2.

FIG. 4B shows exemplary shadow volume primitives of FIG. 4A with those primitives associated with SV1 removed for ease of discussion. Specifically, primitive "P11" 402 is not present in FIG. 4B.

Figure 5:
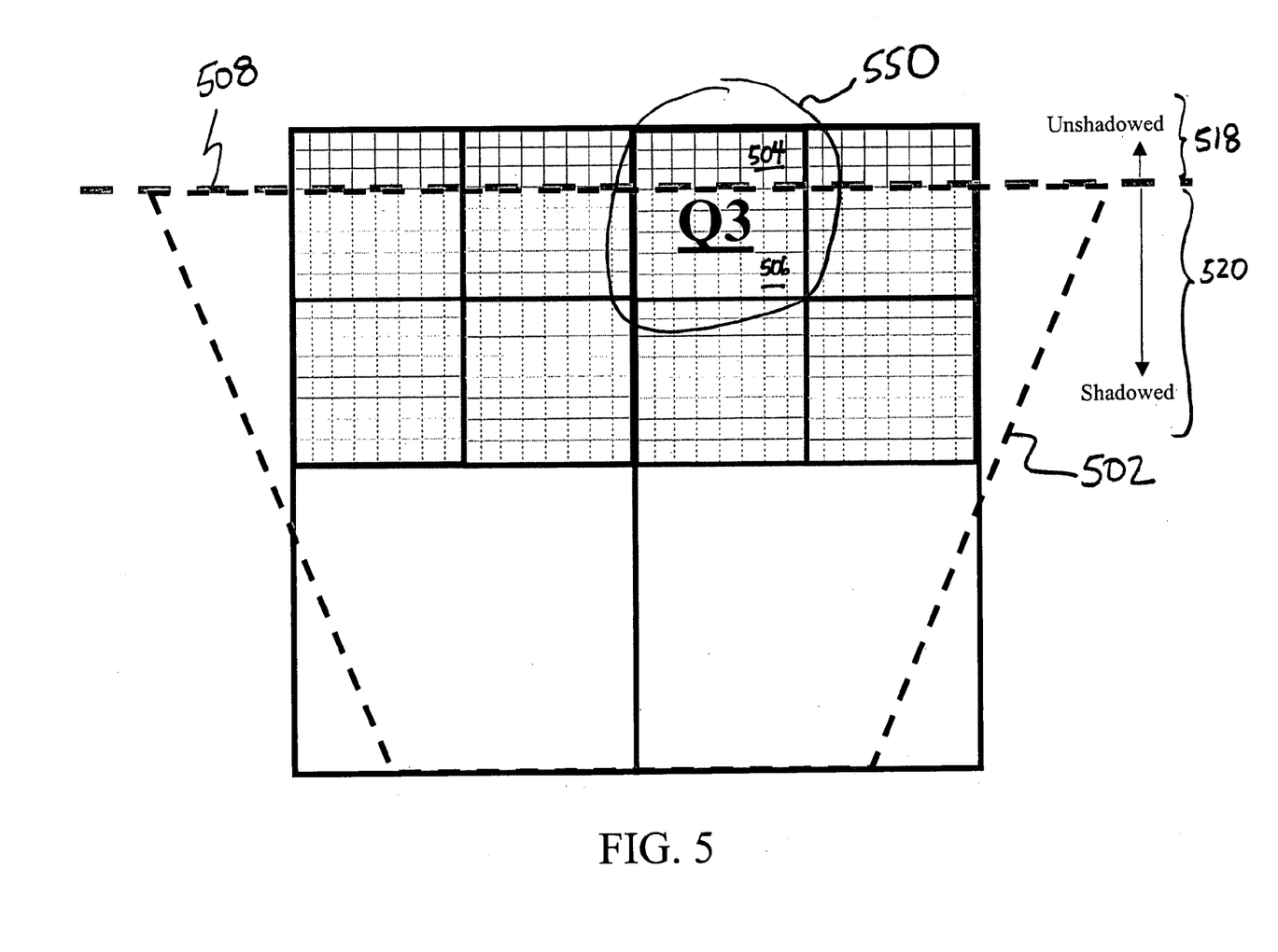
FIG. 5 illustrates a shadow volume primitive formed between the view plane and an object that is disposed on both sides of a shadow volume boundary, according to a specific embodiment of the present invention.

FIG. 5 illustrates a shadow volume primitive formed between the view plane and an exemplary object, such as object B 322 of FIG. 3, according to a specific embodiment of the present invention. As shown, a primitive 502 of a shadow volume is rendered for, among other things, determining whether a SVB depth range overlaps a VG depth range as exemplified at 110 of FIG. 1A. Primitive 502 "covers" but only a part of Q3 such that an edge 508 of primitive 502 bisects Q3 to form a first part 504 and a second part 506. First part 504 is associated with those samples that are shown to be in the unshadowed area 518 (e.g., unshadowed area 318 of FIG. 3) while second part 506 is associated with those samples that are depicted as within shadowed area 520 (e.g., shadowed area 320 of FIG. 3). As Q3 is composed of 64 samples in this example, first part 504 is illustrated to include 32 unshadowed samples, whereas second part 506 includes 32 shadowed samples.

In accordance with at least one specific embodiment of the present invention, an exemplary apparatus for performing all or some of the processes described in exemplary flow 100 of FIG. 1A is described as follows. Such an exemplary apparatus can include a controller, such as a CPU, a GPU, a co-processor, any other like processor, or an amalgam thereof. The controller is configured to manage at least one or more of the processes of flow 100 and to provide information to other processes that perform final scene rendering so to accelerate such rendering, especially with respect to images depicting complex shadow effects. As such, the controller is coupled to control graphical elements that are designed to perform these other processes. Any of these processes can be those performed by a GPU, such as a raster operation ("ROP") process and/or pixel engine, or any like process or engine. These processes can be modularized and performed either in hardware or software, or a combination thereof. Further, the controller can be coupled to a memory for storing information relating to the results of operations as processed in flow 100 of FIG. 1A. The memory can be of any type of memory, such as dynamic random access memory ("DRAM") or the like, of any size (e.g., 1 bit, 3 bits, 1 Mbits, etc.), and can be distributed physically over different locations of the apparatus.

FIGS. 6A–6D, 7A–7C, and 8A–8C illustrate an exemplary process of reducing the amount of data required to generate shadow effects, according to a specific embodiment of the present invention. This reduction effectively is a form of data compression that reduces the amount of data transmitted and/or stored that is necessary to render graphics based on stencil shadow volumes. In particular examples discussed below, FIGS. 6A–6D, 7A–7C, and 8A–8C depict the compression of information relating to quads Q1, Q2, and Q3, respectively, as performed by an exemplary controller and a memory. Each subparts of memory shown in FIGS. 6A–6D, 7A–7C, and 8A–8C, such as the tile stencil buffer, can be the same subpart throughout a series of figures. The same subparts are labeled with different reference numerals to illustrate how information stored in these subparts can change during the process. In accordance with one embodiment of the present invention, the delta count buffers described below are disposed in one or more cache memories, which generally are used for temporary storage for offset values. By contrast, the valid identifier ("ID") buffers and tile stencil buffers are implemented in other types of memory where there values remain storage for periods of time longer than that of the values of the delta count buffers, such as the time during the shadow rendering process.

Figure 6A:
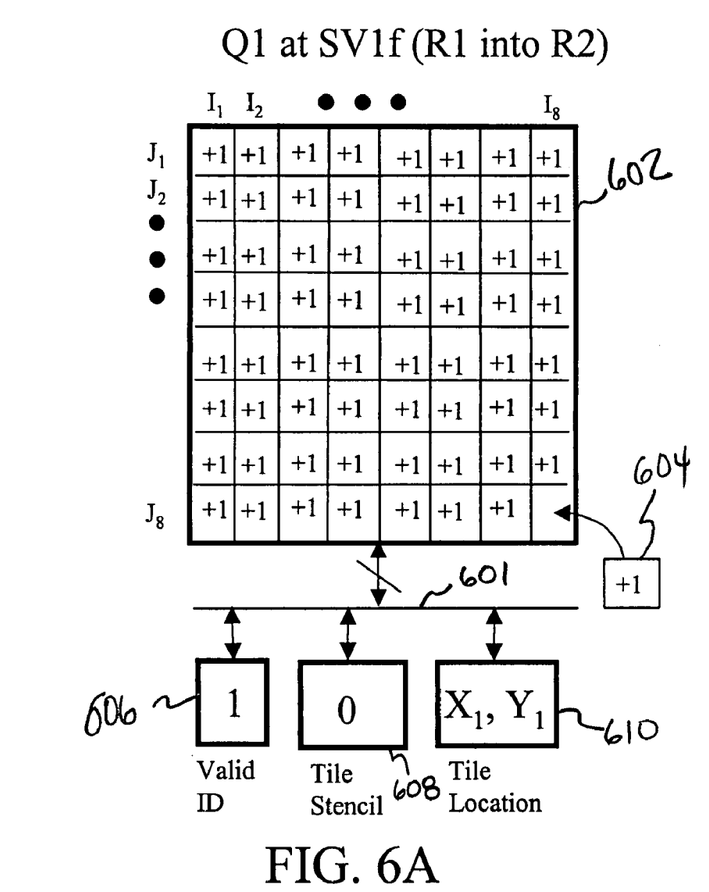
FIGS. 6A–6D show a series of depictions representing a part of the memory for determining whether to compress information relating to a first subset of samples in accordance with one embodiment of the present invention.

FIGS. 6A–6D, 7A–7C, and 8A–8C each include a series of depictions (e.g., FIGS. 6A, 6B, 6C, and 6D) that conceptually represent a part of the memory, such as a cache, for determining whether to compress information relating to a particular quad, such as Q1 for FIGS. 6A–6D. The part of memory depicted in FIG. 6A is illustrative of the exemplary structure and composition of most of the memory parts discussed in connection with FIGS. 6A–8C. As shown in FIG. 6A, a number of delta count buffers 602 are allocated for storing information regarding quad Q1 of FIGS. 2, 3 and 4. Each delta count buffer 602 is uniquely identified by any column ("I") and row ("J"), such as $I_1$, $J_1$, and is each associated with a corresponding sample of quad Q1. Although in this example, each delta count buffer 602 is a 3-bit, signed buffer having a range from −4 to +3, for example, delta count buffers 602 can be of any size and of any range, according to the present invention. In other embodiments, each delta count buffer 602 can be a 3-bit, unsigned buffer having a range from 0 to 7. Note that although a part of memory is shown for only one group of samples (e.g., to represent only one quad), one ordinarily skilled in the art should appreciate that many other groups (e.g., quads) can be stored and operated upon in a similar fashion. That is, delta count buffers 602 are similarly implemented for each quad.

Delta count buffers 602 are coupled via bus 601 to a controller (not shown) and to other subparts of the memory that include a valid identifier ("ID") buffer 606, a tile stencil buffer 608 and a tile location buffer 610. Valid ID buffer 606 is configured to store an indication as to whether the information stored in delta count buffers 602 can be relied upon by the controller to use tile stencil buffer 608 and delta count buffer 602. Tile stencil 608 is used to provide compressed information describing the quad to which delta count buffers 602 relate. That is, tile stencil 608 is configured to store a characteristic of a specific quad, as determined by the information contained in delta count buffers 602. Although in this example, tile stencil buffer 608 is an 8-bit, unsigned buffer and valid ID buffer is a 1-bit buffer, for example, these buffers can be of any size according to the present invention. In accordance with one embodiment, the sum of the delta count buffer and tile stencil buffer values represents a degree of shadowing. For example, if a delta count buffer contains "−1" (representing an exit from a shadow volume) and a tile stencil buffer contains ("+1"), then the sum will be "0," which represents zero degrees of shadowing (i.e., illuminated). Lastly, tile location buffer 610 is configured to store a location on a view plane, for example, on which the specific quad will be rendered. It should be noted that although tile stencil buffer 608 and tile location buffer 610 both include the term "tile," these subparts can be used in conjunction with "quads."

In operation, a controller can detect a shadow volume boundary, such as SVB 250, for a relevant sample, as similarly described in connection with the discussion of block 102 of FIG. 1A. Although the controller can be configured to perform most or all of the processes of flow 100, the following discussion addresses a few of those processes. Prior to operating in accordance with an exemplary method of the present invention, such as with flow 100 of FIG. 1A, the controller can initially set a bit of valid ID buffer 606 to "1" to indicate, for example, that delta count buffers 602 and tile stencil buffer 608 include valid information so long as that bit is set. Further, the identity of a quad to which delta count buffers 602 relate can be identified by, for example, storing a tag such as $X_1$, $Y_1$ so that the controller can readily retrieve compressed information about the particular quad. In particular, such a tag is used to identify the samples associated with a tile location that is to be rendered by, for example, a GPU. Also, the controller can reset the tile stencil buffer to an initial value of zero.

Figure 6B:
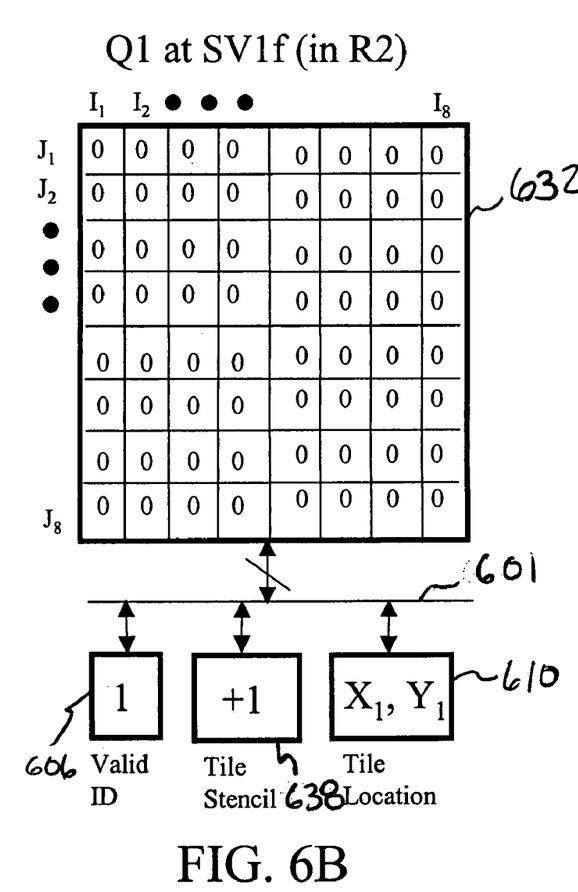

To detect a first shadow volume, the controller searches along lines parallel to the z-axis, the line originating from the view plane 210 of FIG. 2 and extending to a specific sample of an object, such as object A 214. For quad Q1 as shown in FIG. 4, the controller can detect that each sample is "covered" by one or more primitives, such as primitive "P11" 402. This means that for each covered sample, shadow volume 203 is entered as the controller searches along the lines. As such, the controller can increment each of delta count buffers 602 so that they contain a value of "+1," as shown in FIG. 6A. This figure depicts the samples of Q1 at SVB 250 while searching from R1 into R2. After the last delta count buffer is incremented with value 604 (e.g., +1) in delta count buffer $I_8$, $J_8$ (or any other buffer that is the last operated upon), the controller can determine whether all samples have the same relative degree of shadowing, such as depicted at block 114 in FIG. 1A. As each delta count buffer 602 contains the same value, the controller will determine that in this case these buffers have the same relative degree of shadowing, such as at block 116, which can be represented by the value "+1." The controller then can store "+I" in tile stencil 638 of FIG. 6B, which depicts any sample of Q1 within SV1 203 (i.e., in R2) of FIG. 2. In addition, the controller can reset delta count buffers 632 to values of zero in preparing to detect additional shadow volume boundaries, as shown in FIG. 6B.

Figure 6C:
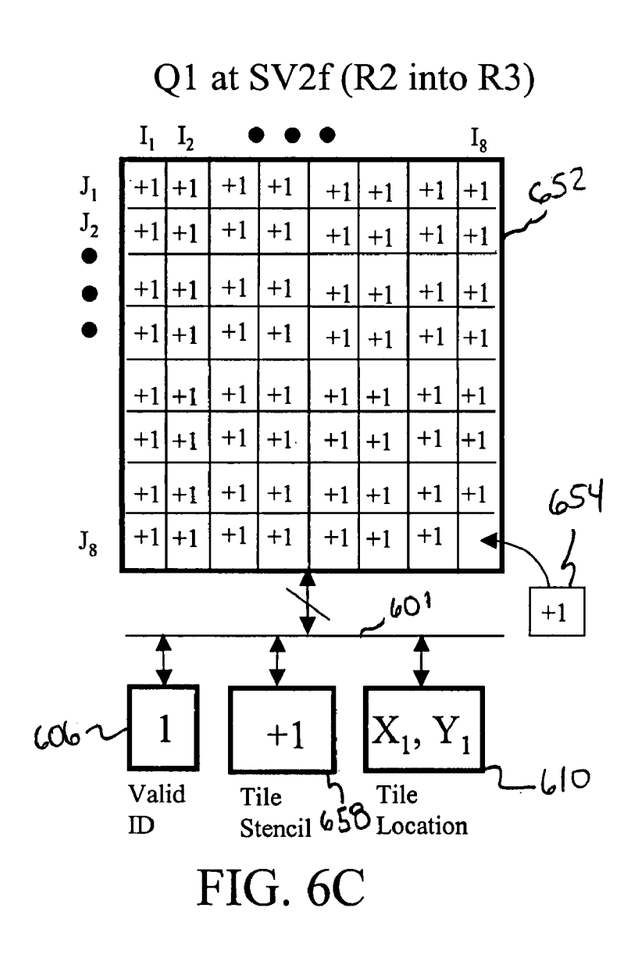
Figure 6D:
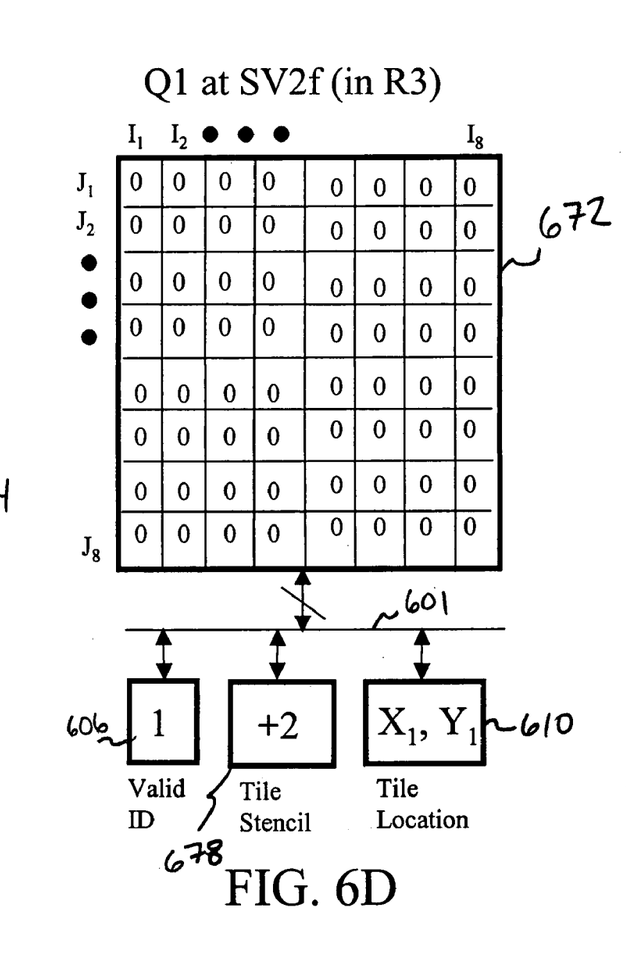

Similar to FIG. 6A, but when the controller detects another shadow volume boundary, such as SVB 252 of FIG. 2, then the controller can determine whether the samples of quad Q1 are covered. As shown in FIG. 4B, quad Q1 is "covered" also by primitive 404. Because each sample of Q1 is covered by primitive 404, the controller will determine that a line (e.g., a ray) associated with each sample will enter SVB 252. As such, the controller will again increment all delta count buffers 652 to +1 as is shown in FIG. 6C. After the last delta count buffer is incremented with value 654 (e.g., +1) in any delta count buffer 652, the controller can again determine whether all samples have the same relative degree of shadowing. Since each delta count buffer 652 contains the same value, the controller can determine that in this case these buffers have the same relative degree of shadowing, which can be represented as "+2." This value is then stored in tile stencil 678, overwriting the previous value of +1 in tile stencil buffer 658. In addition, the controller can reset delta count buffers 672 to values of zero in preparation for detecting additional shadow volume boundaries, as shown in FIG. 6D, if any are to be discovered.

According to a specific embodiment, the controller then can periodically confirm, so long as the valid ID remains "1" (indicating that the value of the tile stencil buffer and tile delta counts are reliable), whether the value of the tile stencil has changed since last time was checked. If it has changed, then the controller can, for example, provide the updated value as compressed information (e.g., +2) to represent the degree of shadowing for an entire quad. Typically this is done after the shadow volumes for a light source have been rendered, as well as processed, in accordance with an embodiment of the present invention. For example, when detecting that tile stencil 658 changed from +1 to +2 (as shown in tile stencil 678), the controller can provide "+2," and optionally, tile location $X_1$, $Y_1$ to a GPU to generate the proper shadowing effects. In some embodiments, the tile stencil value and tile location is sufficient for a GPU to properly render shadow effects according to the present invention.

FIGS. 7A–7C conceptually represent a part of the memory for determining whether to compress information relating to another exemplary particular quad, such as Q2 shown in FIGS. 2, 3, and 4. FIG. 7A shows delta count buffers 702 where a first set of delta count buffers 704 have been incremented and a second set of delta count buffers 706 are yet to be incremented, where the first and second sets are demarcated by line 708. As shown, valid ID buffer 712 is initialized with 1 (to indicate validity), tile stencil buffer 720 is initialized with 0, and tile location buffer 710 includes a location of Q2, such as $X_2$, $Y_2$, where Q2 is to be rendered on a view plane. In this instance, line 708 is analogous to the edges of primitive 402 and 406 of FIG. 4B that bisect quad Q2 into first part 450 and second part 452.

In this example, the controller determines that only one primitive partially covers Q2 (i.e., primitive 404) at a point in time before another primitive (i.e., primitive 406) is rendered. The controller at this time can determine that first part of Q2 450 (and the samples therein) are covered by primitive 404. As such, only those delta count buffers 702 that are associated with covered samples are incremented. Hence, only the first set of delta count buffers 704 is incremented.

But after another primitive is rendered and is determined to cover the remaining samples of Q2, as is the case with primitive 406 covering the samples associated with second part of Q2 452. The controller then can increment the second set of delta count buffers 706 as shown in FIG. 7B. And after the last value 724 is stored in delta count buffers 722, and after the controller determines that each value in the delta count buffers 722 is the same, tile stencil buffer 760 can be updated with a value (e.g., "+1"), which is representative of a characteristic common to all samples of Q2 at that time. Then, as shown in FIG. 7C, delta count buffers 732 can be cleared to zero.

Figure 8A:
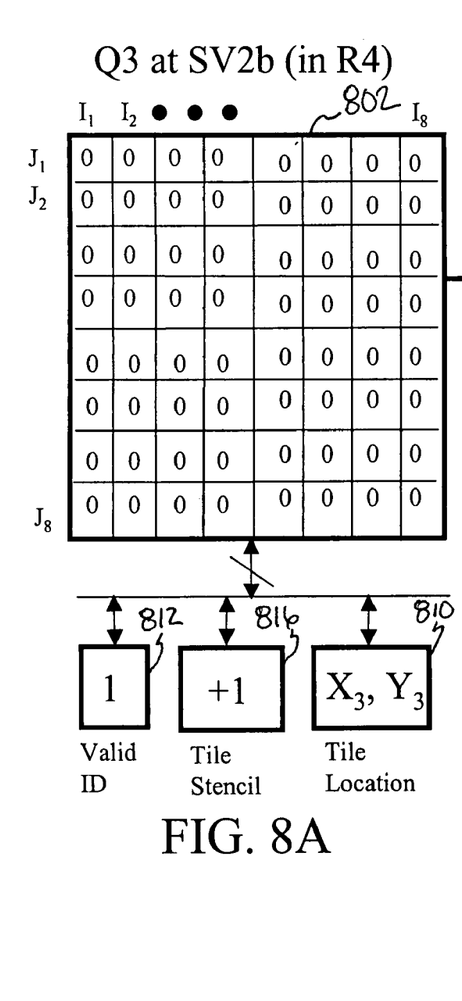
FIGS. 8A–8C show a series of depictions representing a part of the memory for determining whether to compress information relating to a third subset of samples in accordance with one embodiment of the present invention.
Figure 8B:
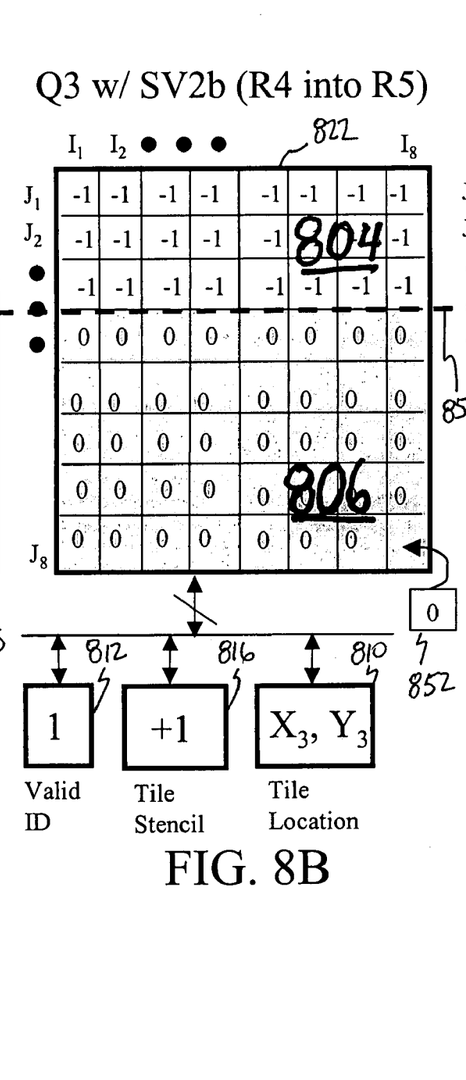
Figure 8C:
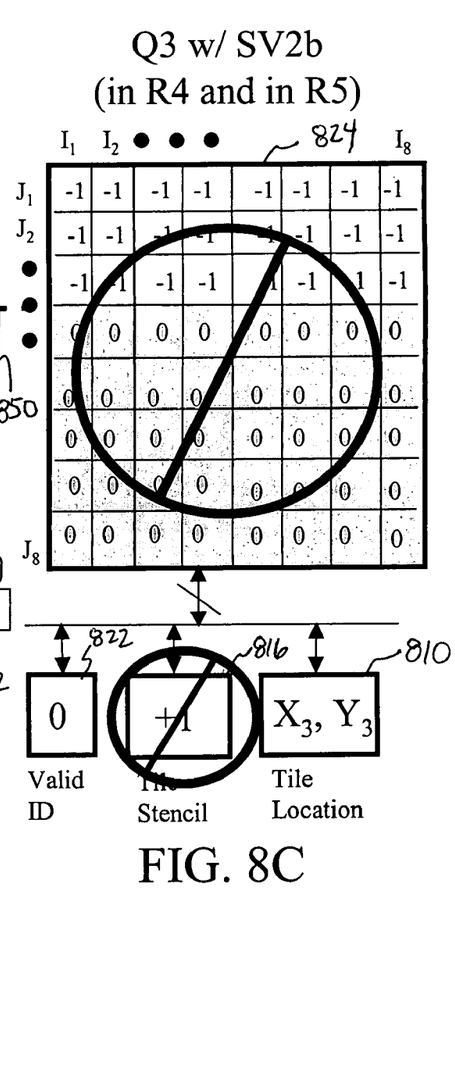

FIGS. 8A–8C conceptually represent a part of the memory for determining whether to compress information relating to yet another exemplary particular quad, such as Q3 shown in FIGS. 2, 3, and 5. FIG. 8A shows delta count buffers 802 yet to be incremented, and containing values of zero (i.e., reset from previous determination that all samples were the same). As shown, valid ID buffer 812 is initialized with 1 (to indicate validity), tile stencil buffer 816 has a value of +1, and tile location buffer 810 includes a location of Q3, such as $X_3$, $Y_3$, where Q3 is to be rendered on a view plane. In this instance, the controller has already determined that each sample of Q3 is covered by primitives forming SVBs 250, 252, and 254. At this point, the controller is searching parallel lines in region R4 associated with each sample of Q3 to detect a last shadow volume boundary, such as SVB 256. Region R4 is generally associated with a stencil count of +1 as there are two increments for each pass into of SVBs 250 and 252 (entering a shadow volume) and one decrement for a pass out from SVB 254 (leaving a shadow volume). Hence, tile stencil buffer 816 contains a value representative of the degree of shadowing associated with each sample of Q3 in R4.

FIG. 8B illustrates delta count buffers 822 after detecting SVB 256. A first set of delta count buffers 804 have been decremented since the samples associated with these buffers (i.e., in first part 504 of FIG. 5) have "exited" out from "SV 2" 205 of FIG. 2. But a second set of delta count buffers 806 remains at zero because samples associated with these buffers (i.e., in second part 506 of FIG. 5) remain within a shadow volume. Line 850 of FIG. 8B demarcates the buffers 822 similar to that provided by line 508 to distinguish unshadowed and shadowed samples.

After last value 852 is determined for second set of delta count buffers 806, then the controller can determine whether each sample of Q3 is of the same degree of shadowing after detecting SVB 256. In this instance, each delta count buffer 842 of FIG. 8C is determined to not represent the same degree of shadowing. Thus, the controller determines here that information describing quad Q3 cannot be compressed readily. So, the valid ID buffer 822 is reset to a value of zero. This indicates that the information stored in buffers 842 of FIG. 8C is deemed unreliable and will not be used. In accordance with one embodiment of the present invention, a GPU then can be tasked with rendering shadow effects, typically without compressed information.

The controller can operate to free up memory by releasing parts of memory, such as delta counter buffers 842, when the information therein is deemed unreliable.

Figure 9:
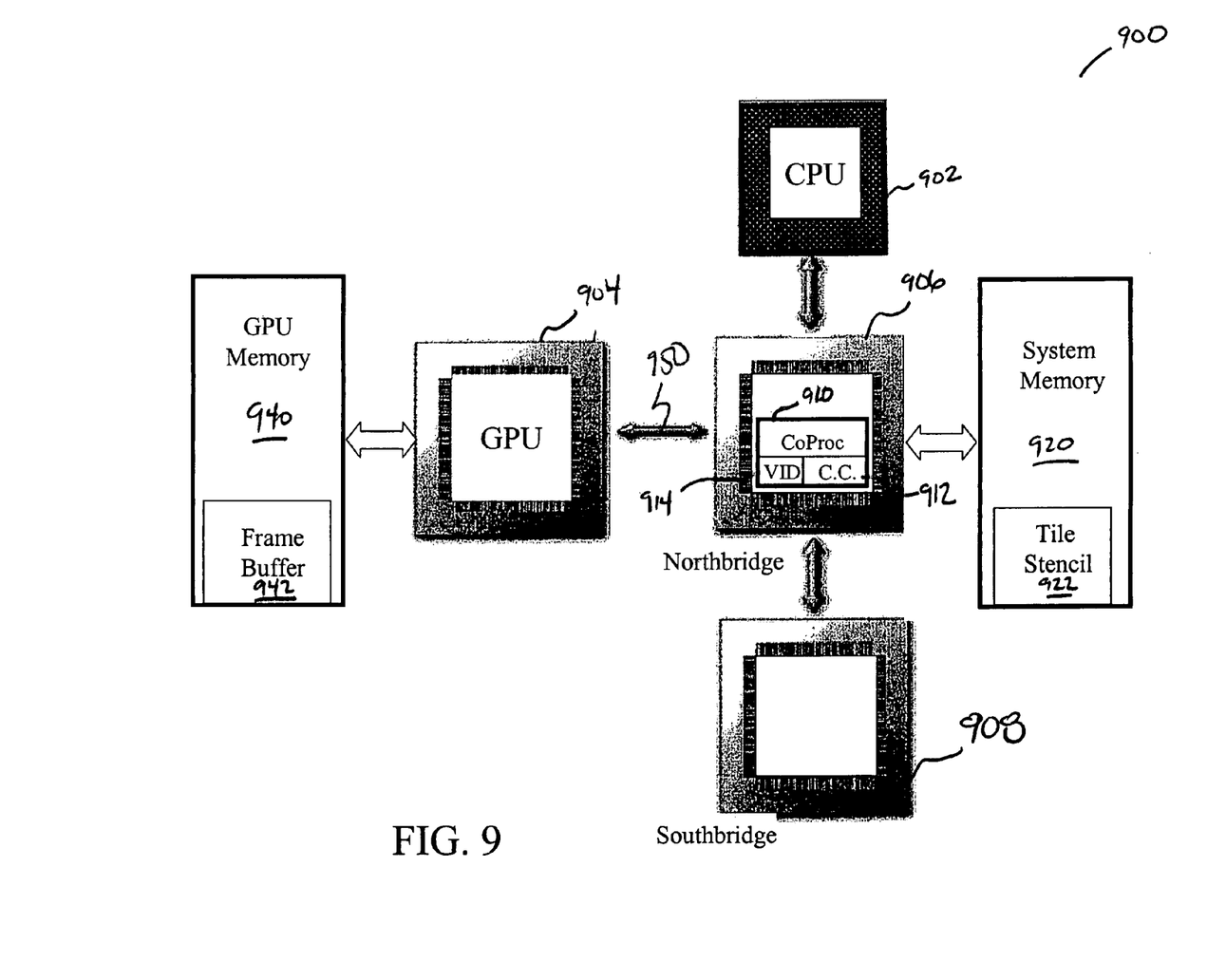
FIG. 9 illustrates an exemplary apparatus according to an embodiment of the present invention.

FIG. 9 is an exemplary apparatus 900 according to an embodiment of the present invention. Apparatus 900 includes a CPU 902 coupled to modified "Northbridge" circuitry 906. Modified Northbridge circuitry 906 is coupled to system memory 920, which includes one or more tile stencils 922. Further, modified Northbridge circuitry 906 is coupled to GPU 904 via AGP or PCI Express 950 and is coupled also to "Southbridge" circuitry 908. Modified Northbridge circuitry 906 is configured to control communications between system memory 920, CPU 902, a cache, such as coalescing cache ("C.C.") 912, an AGP or PCI Express bus 950, and like elements. Southbridge circuitry 908 generally is configured to control communications between the buses, such as the ISA bus, IDE controller, BIOS, USB, power control, ports, etc. Exemplary apparatus 900 includes GPU memory 940, which includes a frame buffer 942 to prepare data for rendering as a graphical image.

According to a specific embodiment of the present invention, modified Northbridge circuitry 906 is configured to include a co-processor 910 circuit. Co-processor circuit 910 can includes a memory configured as one or more valid ID buffers 914 and further configured to provide coalescing cache 912, which includes a number of delta count buffers. Generally, co-processor circuit 910 is designed to perform and/or manage the processing of the exemplary methods described herein.

In some embodiments, co-processor 910 circuit performs the exemplary methods of the present invention during a "first pass" of a two-pass stenciled shadow volume algorithm for rendering shadow effects. During this first pass, co-processor 910 circuit generates compressed information regarding each of the tiles (or quads) to be rendered by, for example, GPU 904 during a "second pass." The first pass includes a coarse rendering of shadow volumes for determining which samples can be described by compressed information, such as by a set valid bit and tile stencil buffer. Such information can be accompanied by a tag identifying a tile (or quad) location for rendering on a view plane, according to a specific embodiment. This compressed information frees up bandwidth, for example, on AGP or PCI Express 950, as well as in memory, as compared to conventional shadow volume rendering processes that prepare and utilize information on a sample-by-sample basis. During the second pass, the GPU processes samples that otherwise could not be processed in the first pass, such as in the instance of a silhouette edge, or such as was the case discussed in connection with FIG. 8C.

Apparatus 900 can be a graphics card including one or more of the elements shown in FIG. 9 as a separate chip. But apparatus 900 can also be a single chip including one or more elements shown in FIG. 9 as a collection of integrated circuits ("ICs") formed as a single IC.

In accordance with at least one specific embodiment of the present invention, apparatus 900 can be implemented as any computer-based system, in whole or in part, such as a workstation, a laptop or notebook, a mobile computing and/or communication device, such as a personal digital assistant ("PDA"), a game console, or any other computing platform.

It will be understood that some or all of the processes described herein can be implemented, in part or in whole, as one or more software modules. An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method for compressing information used for rendering shadows, the method comprising:
    determining that each sample of a subset of samples is associated with an equivalent degree of shadowing for a portion of a computer-generated image, including:
        identifying a visible geometry ("VG") depth range for said subset; and
        determining whether said VG depth range overlays a shadow volume boundary ("SVB") depth range; and
    generating an indicator representing said degree of shadowing associated with said subset of samples.

2. The method of claim 1 wherein each sample of said subset of samples is contiguous with other samples of said subset.

3. The method of claim 1 further comprising transmitting said indicator to decrease an amount of data traffic.

4. The method of claim 1 wherein said degree of shadowing corresponds to a number of stencil shadow volumes associated with said subset.

5. The method of claim 1 further comprising prohibiting the generation of said indicator if said VG depth range overlaps said SVB depth range.

6. The method of claim 1 further comprising determining whether said VG depth range overlaps another SVB depth range.

7. The method of claim 1 wherein generating said indicator comprises:
    forming said indicator having a first value if said subset is associated with a first degree of shadowing; and
    forming said indicator having a second value if said subset is associated with a second degree of shadowing.

8. The method of claim 7 wherein
    said first degree of shadowing represents that each sample of said subset is illuminated, and
    said second degree of shadowing represents that each sample of said subset is associated with one or more stencil shadow volumes,
        wherein said second degree represents that each said sample is shadowed.

9. The method of claim 1 wherein generating said indicator comprises:
    forming said indicator having a first value if said subset is associated with a first degree of shadowing; and
    forming multiple indicators each having one of a multiple values if said subset is associated with multiple degrees of shadowing.

10. The method of claim 1 wherein said indicator further comprises a location identifier for locating on a view plane where said subset is rendered.

11. The method of claim 1 wherein said indicator is configured to cause a rendering process to forego an update to a frame buffer.

12. The method of claim 1 wherein said indicator is configured to cause a rendering process to forego a computation in rendering a shadow.

* * * * *